United States Patent [19]

Kajiyama

[11] 3,988,141

[45] Oct. 26, 1976

[54] METHOD FOR IMPROVING SOIL

[76] Inventor: Yoshiaki Kajiyama, Room No. 813 Mezon Koushein, 14-18 Futamicho, Nishinomiya, Hyougo, Japan

[22] Filed: Jan. 23, 1975

[21] Appl. No.: 543,410

[30] Foreign Application Priority Data

Feb. 1, 1974 Japan .............................. 49-13959
July 24, 1974 Japan .............................. 49-94427

[52] U.S. Cl. .............................. 71/63; 71/64 SC
[51] Int. Cl.[2] .............................. C05D 3/02
[58] Field of Search .............. 71/31, 63, 53, 64 SC; 252/475; 423/173, 635

[56] References Cited

UNITED STATES PATENTS

| | | | |
|---|---|---|---|
| 1,747,281 | 6/1927 | Baker | 71/63 |
| 2,258,709 | 10/1941 | Mac Intire | 71/63 |
| 2,817,582 | 12/1957 | Chaney | 71/63 |
| 3,214,261 | 10/1965 | Galloway | 71/53 |
| 3,890,225 | 6/1975 | Kajiyama | 210/32 |

OTHER PUBLICATIONS

Chem. Abstracts vol. 30:1698.

*Primary Examiner*—Charles N. Hart
*Assistant Examiner*—Ernest G. Therkorn
*Attorney, Agent, or Firm*—Armstrong, Nikaido & Wegner

[57] ABSTRACT

Finely divided coral fossil limestone is mixed with paddy field soil and upland soil to improve soils, whereby a 40% increase is achieved in the yields of crops such as lowland rice, spinach and turnips. Even when excessively added to soil, coral fossil limestone produces no adverse effect unlike conventional fertilizers and soil improving agents but maintains soil pH at a substantially neutral value. Because of its excellent properties as a soil improving agent, coral fossil limestone finds a novel application in improving soils to give increased crops.

7 Claims, 1 Drawing Figure

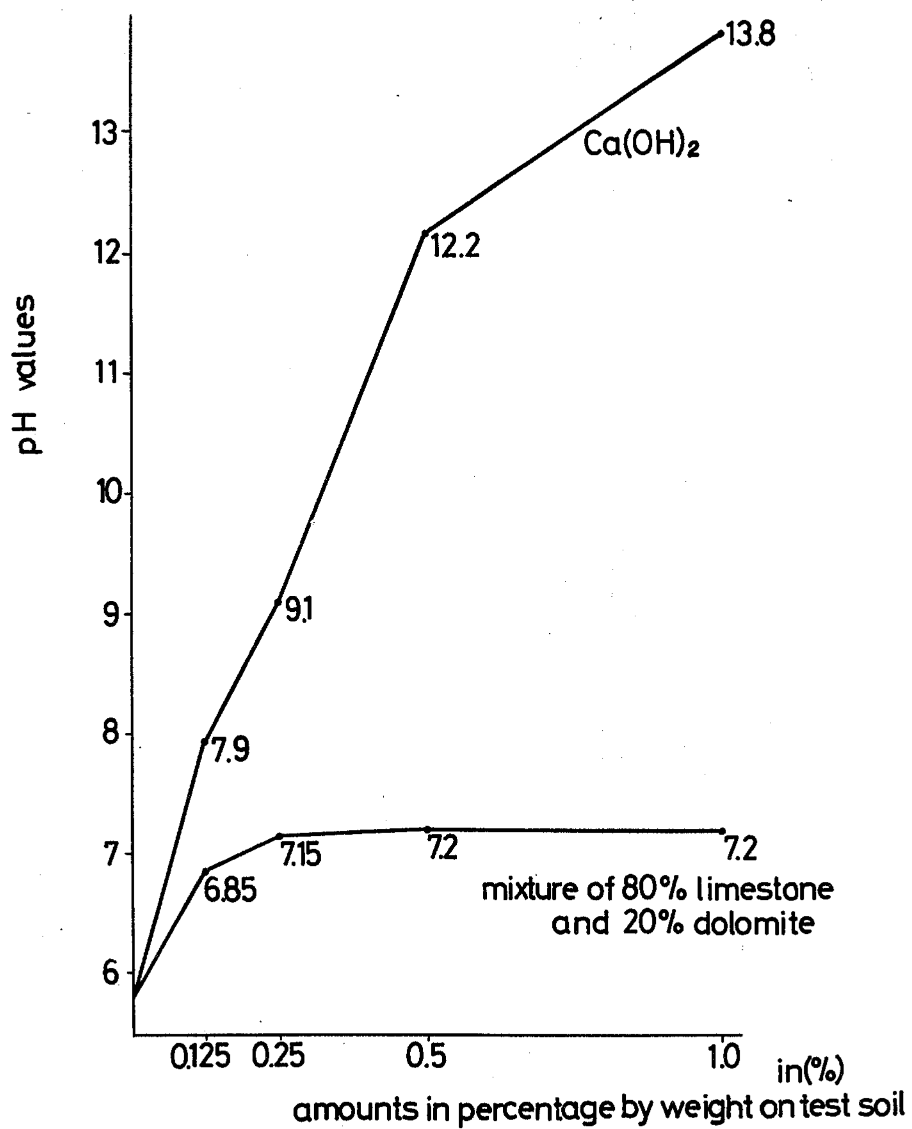
pH values of test soil
pH values
13
12
11
10
9
8
7
6
13.8
$Ca(OH)_2$
12.2
9.1
7.9
7.15
7.2
7.2
6.85
mixture of 80% limestone
and 20% dolomite
0.125 0.25 0.5 1.0
in(%)
amounts in percentage by weight on test soil

METHOD FOR IMPROVING SOIL

BACKGROUND OF THE INVENTION

Coral limestone which is formed by accumulation of remains of coral, foraminifera, lime algae and mollusca occurs abundantly in the South Sea Islands, the Amami Islands, Tokunoshima Island, Okierabujima Island, Yoronto Island, and the Okinawa Islands. Although recently introduced into use for the foundation of road, it was unserviceable for any other use.

Based on the finding that coral fossil limestone has an excellent ability to adsorb heavy metals, the present inventor already accomplished the invention of U.S. patent application Ser. No. 367,357 now U.S. Pat. No. 3,898,225. Further researches have revealed that coral fossil limestone improves soils to give increased yields, evidencing its novel application as a soil improving agent or fertilizer.

Conventionally, finely divided limestone ($CaCO_3$), quick lime ($CaO$), slaked lime ($Ca(OH)_2$) and magnesia-lime fertilizer are used in admixture with acid soils for soil improvement. However, these materials act merely to neutralize acidity and sharply elevate soil pH in proportion to the amount used, consequently involving an extremely limited tolerance in obtaining the desired neutral pH value. Furthermore they fail to act protractedly to a significant extent. In other words, they have a low ability to afford a sustained soil improving effect and are therefore difficult to use in adequate amounts. With excess amounts, they kill the plant. Quick lime irritates the skin and is hazardous to the respiratory organs, possibly producing adverse effects on man and animals exposed thereto.

SUMMARY OF THE INVENTION

The present invention provides a method for improving soils by mixing coral fossil limestone, finely divided to particle sizes of not larger than 30 mesh, with paddy field soil, upland soil and like field soil to neutralize acid soils to the desired pH value, to improve aggregation of soil particles for satisfactory aeration and drainage, to promote plant growth with various organic substances and micronutrients contained in the coral fossil limestone and to thereby ensure increased yields.

Further according to this invention, a specified amount of basic magnesium compound is added to coral fossil limestone and the resulting mixture is applied to soil in admixture therewith to improve the soil. Thus crops are made available in higher yields by the application of the mixture which improves the soil and at the same time remedies a deficiency of magnesium, a prevailing characteristic of depleted soils.

The coral fossil limestone to be used according to this invention, even if applied in excess amounts, still maintains the soil at a proper neutral pH value and remains effective protractedly. Being applicable with a wide tolerance, it is usable with ease and entails no adverse effect on crops and soils even with excess amounts. Thus this invention discloses a novel application of coral fossil limestone as a soil improving agent.

BRIEF DESCRIPTION OF DRAWING

The drawing is a graph showing the results of experiments conducted using a mixture of 80% by weight of coral fossil limestone and 20% by weight of dolomite as mixed with upland soil, comparison with the results achieved by the application of slaked lime ($Ca(OH)_2$) to upland soil. The amounts in percentage by weight of the mixture and slaked lime based on the test soil are plotted as abscissa VS. soil pH values as ordinate.

DETAILED DESCRIPTION OF THE INVENTION

The treating material used in the practice of the present invention is coral fossil (Loochoo coral reef rock) consisting mainly of limestone, abundantly occurring in nature in the form of layers on the coral reefs of the South Sea Islands, the Amami Islands, Okierabujima Island, the Okinawa Islands and Tokunoshima Island, which is ground into sand-like particles. This coral fossil is mineralogically composed of calcite containing an amount of aragonite. The coral fossil is formed of the remains of coral, forminifera, lime algae, mollusca, etc. of the quaternary period of the geologic time, and is extremely porous, brittle and soft as compared with the limestone occurring in geologic old time.

This invention reveals the novel usefulness of coral fossil limestone as soil improving agent and fertilizer for improving soils and remarkably promoting growth of crops.

Given below are the compositions of coral fossil limestone, dolomite to be mixed therewith and a mixture of 80% by weight of coral fossil limistone and 20% by weight of dolomite.

| Constituents | Coral fossil limestone | Dolomite | Mixture of 80 % limestone and 20 % dolomite |
|---|---|---|---|
| $P_2O_5$ | 0.13 | 0.11 | 0.12 |
| $K_2O$ | 0.007 | — | 0.006 |
| $CaO$ | 55.45 | 34.05 | 51.16 |
| $MgO$ | 0.30 | 14.08 | 3.05 |
| $SO_4$ | 0.036 | — | 0.03 |
| $Na_2O$ | 0.039 | — | 0.03 |
| $SiO_2$ | 0.7 | 0.83 | 0.73 |
| $Fe_2O_3$ | 0.21 | 0.08 | 0.18 |
| Cl | 0.035 | — | 0.03 |
| Cu | 0.0008 | — | 0.0006 |
| Mn | 0.005 | — | 0.004 |
| Mo | — | — | — |
| Zn | Trace | — | — |
| $Al_2O_3$ | 0.11 | 0.07 | 0.10 |

To determine the influence on the yield produced by the application of coral fossil limestone to the soil, experiment was carried out by practicing the method of this invention and by using limestone alone as mixed with the soil in conventional manner for the comparison of soil pH values obtained.

Experiment

According to Japanese Soil Testing Standards, 3 kg of sandy upland soil was placed into each of Wagner pots, the mass of soil having a surface area of 1/5000 are. Ordinary limestone, finely divided to particles sizes of 30 mesh or smaller, was added to the soil in one group of pots in amounts of 0.2, 0.5 and 1.0% by weight based on the weight of the soil, whilst coral fossil limestone, finely divided to particles sizes of not larger than 30 mesh was added to the soil in the other group of pots similarly in amounts of 0.2, 0.5 and 1.0% by weight based on the weight of the soil. Under the same conditions, the pots were then used for the cultivation of lowland rice with application of fertilizers containing nitrogen, phosphorus and potassium in known manner.

| Amount of limestone (wt. %) | Yield of brown rice (g/pot) Usual limestone | Coral fossil limestone |
|---|---|---|
| 0.2 | 3.7 | 5.4 |
| 0.5 | 4.5 | 5.7 |
| 1.0 | 4.1 | 6.3 |

The experiment reveals that according to the conventional soil improving method using usual limestone in admixture with soil, the yield increases with the increase of limestone from 0.2 to 0.5% by weight, whereas with the further incrase of amount of 1.0% by weight, the yield conversely reduces. This indicates that limestone is harmful if applied in an exxcess amount and should be used in a limited amount. In contrast, the yields resulting from the application of coral fossil limestone are 40 to 50% higher than those achieved by the same amount of usual limestone. Moreover, coral fossil limestone gives a higher yield with the increase in its amount used, without entailing any objectionable influence on the crop and adversely affecting the skin of the worker.

Field Tests

1. Cultivation test for lowland rice at Shiga Prefecture Argiculture Experiment Station a. Test scale:

Two lots of field, each having an area of 100 m$^2$, were used for each of the fertilizers tested.

b. Cultivation density:

Clumps of rice seedlings were transplanted at a density of 21.14 clumps/m$^2$, each clump including 3 to 4 seedlings.

c. Kinds of fertilizers tested:

Coral fossil limestone of this invention, slaked line and calcium carbonate.

d. Amounts (kg/10 ares) of fertilizers used:

| Fertilizer | Amount of fertilizer used Initial appln. | Additional application First | Second* | Third** | Total |
|---|---|---|---|---|---|
| N | 4.0 | 1.0 | 1.5 | 1.5 | 8.0 |
| $P_2O_5$ | 4.0 | 0 | 0 | 0 | 4.0 |
| $K_2O$ | 4.0 | 0.9 | 0.9 | 1.33 | 7.6 |
| Coral fossil limestone | 211.3 | — | — | — | 211.3 |
| Slaked lime | 193.9 | — | — | — | 193.9 |

-continued

| Fertilizer | Amount of fertilizer used Initial appln. | Additional application First | Second* | Third** | Total |
|---|---|---|---|---|---|
| Calcium carbonate | 219.4 | — | — | — | 219.4 |

*The fertilizers were given 1 month before the development of spikes.
**The fertilizers were given 15 days before the development of spikes.

e. Yields:

The amounts of straw, paddy, brown rice, broken rice are all expressed in terms of kg/are unless otherwise indicated.

| Fertilizer tested | Lot number | Straw | Paddy | Brown rice | Broken rice | 1,000 Grains of paddy (g) | Yield rate |
|---|---|---|---|---|---|---|---|
| None | 1 | 69.70 | 61.30 | 49.45 | 0.88 | 23.92 | |
| | 7 | 74.39 | 65.36 | 53.36 | 0.33 | 23.89 | |
| | Average | 72.05 | 63.33 | 51.41 | 0.61 | 23.91 | 104 |
| Slaked lime | 2 | 80.91 | 62.91 | 51.24 | 0.58 | 23.84 | |
| | 8 | 71.48 | 62.03 | 50.79 | 0.52 | 23.57 | |
| | Average | 76.20 | 62.47 | 51.02 | 0.55 | 23.71 | 103 |
| Calcium carbonate | 3 | 74.30 | 64.03 | 52.24 | 0.79 | 23.89 | |
| | 5 | 82.42 | 58.73 | 47.67 | 0.45 | 23.82 | |
| | Average | 78.36 | 61.38 | 49.46 | 0.62 | 23.86 | 100 |
| Coral fossil limestone | 4 | 83.00 | 71.15 | 58.70 | 0.48 | 23.87 | |
| | 6 | 78.48 | 64.12 | 52.61 | 0.52 | 23.88 | |
| | Average | 80.74 | 77.64 | 55.66 | 0.50 | 23.88 | 112.54 |

Note: Generally in the case of rice, wheat and barley, a difference of at least 5% in yield, if achieved, is evaluated as the effect of fertilization.

2. Cultivation test for chinese cabbages by Hyogo Prefecture Fertilizer Association a. Test scale:

Five-are lot.

b. Kinds of the fertilizers tested:

Coral fossil limestone of this invention and slaked lime (control).

c. Amounts (kg/10 ares) of fertilizers used:

| Fertilizer | Initial application | Additional application | Total |
|---|---|---|---|
| N | 25.6 | 8.0 | 33.6 |
| $P_2O_5$ | 24.0 | 1.2 | 25.2 |
| $K_2O$ | 22.4 | 8.0 | 30.4 |
| Silicic sand | 0.5 | — | 0.5 |
| (Fertilizer tested) | | | |
| Coral fossil limestone | 180.0 | G1— | 180.0 |
| Slaked lime | 140.0 | — | 140.0 |

d. Yields (average weight (kg) of cabbages):

| | Gross weight | Net weight* | Yield rate |
|---|---|---|---|
| This invention | 4.234 | 3.032 | 130.2 |
| Control | 3.092 | 2.328 | 100 |

*The weight of the edible portion of cabbage.

It is especially noted that coral fossil limestone of this invention exhibits a sustained effect to maintain soil pH at the desired value, as distinct from slaked lime and calcium carbonate. This is attributable to the fact that coral fossil limestone is porous and brittle and accordingly becomes gradually dissolved out. Examples of pH variations achieved are given below.

a. Paddy field soil (the foregoing rice culltivation lots)

| | Before appln. | After application | | |
|---|---|---|---|---|
| | | On 7th day | On 20th day | on 140th day |
| Coral fossil limestone | 6.27 | 6.58 | 6.60 | 6.65 |
| Slaked lime | 6.27 | 6.70 | 6.60 | 6.53 |
| Calcium carbonate | 6.27 | 6.52 | 6.77 | 6.58 |

b. Upland soil (the forgoing cabbage cultivation lots)

| | Coral fossil limestone | Slaked lime |
|---|---|---|
| Before appln. | 6.1 | 5.9 |
| After appln. | | |
| On 7th day | 6.6 | 6.4 |
| 18th | 6.5 | 5.9 |
| 30th | 6.7 | 6.6 |
| 50th | 7.0 | 6.5 |
| 75th | 7.1 | 6.6 |

c. Upland soil (tomato cultivation lots)

| | Before appln. | After application | |
|---|---|---|---|
| | | On 7th day | On 90th day |
| Coral fossil limestone | 5.1 | 7.3 | 6.15 |
| Calcium carbonate | 5.1 | 7.5 | 4.85 |
| Slaked lime | 4.8 | 7.95 | 5.0 |
| None | 5.05 | 5.0 | 4.4 |

Generally in an acid soil, magnesium is prone to leaching and there is a need to replenish the soil with magnesium simultaneously when it is neutralized with coral fossil limestone. Since coral fossil limestone contains only 0.3% of magnesium as listed previously, a magnesium replenishing agent is further added thereto according to this invention.

The magnesium replenishing agent must meet the requirements of assisting in the improvement of pH of acid soils, being free of leaching and degradation owing to rainwater and having a sustained effect. Various experiments on magnesium compounds have revealed that basic compounds are most satisfactory in fulfilling the above requirements. The basic compounds to be used as magnesium replenishing agents are used in the form of particles or granules. Dolomite is especially preferable to use. If the proportion of dolomite to be mixed with coral fossil limestone is less than 10% by weight (i.e., less than 1.0% by weight calculated as MgO), a low effect will result, whereas proportions of dolomite in excess of 40% by weight (i.e., above 10.0% by weight calculated as MgO) reduce the calcium content, entailing the necessity to use a larger amount of the mixture, and impede the absorption of trace elements such as boron. It is therefore preferable to use a basic magnesium compound in a proportion of 1.0 to 10.0% by weight calculated as MgO.

Magnesium hydroxide is usable as a magnesium replenishing agent in a proportion of up to 10% by weight without giving a substantial adverse effect.

The first table above shows the composition of a soil improving agent according to this invention which is prepared by mixing 20% by weight of dolomite with 80% by weight of coral fossil limestone. The accompanying drawing shows the results of experiments conducted by adding varying amounts of the soil improving agent to an acid test soil and by using varying amounts of slaked lime, $Ca(OH)_2$, as a soil improving agent, for the comparison of soil pH values obtained. It is seen that the use of slaked lime sharply increases soil pH with the increase of its amount and involves an extremely limited tolerance in achieving an appropriate neutral value. In fact, the application of slaked lime fails to assure proper neutrality uniformly throughout the entire area, entailing the hazard of giving a partially increased pH value.

In contrast, the soil improving agent of this invention, even if used in insufficient or excess amounts, acts moderately to maintain uniform neutral soil pH, exhibiting an excellent effect for soil improvement.

In the same manner as in the foregoing Experiment and according to usual method of cultivation, lowland rice, spinach and turnip were grown, using fertilizers of three elements and four kinds of soil improving agents, namely commercial quick lime of the standard quality as a fertilizer, magnesia-lime, coral fossil limestone and a mixture of 80% coral fossil limestone and 20% dolomite. The yields obtained are listed below for comparison.

| | Lowland rice | | Spinach | Turnip |
|---|---|---|---|---|
| Amount of soil improving agent used (wt. %) | 0.2 | 0.5 | 0.25 | 0.25 |
| Yield given by soil improving agent | | | | |
| Quick lime | 4.5 g | 5.4 g | 1.7 g | 4.7 g |
| Magnesia-lime | — | — | 1.9 | 4.9 |
| Coral fossil limestone | 6.4 | 6.7 | 2.3 | 6.7 |
| Mixture of 80% coral fossil limestone and 20% dolomite | 6.9 | 7.1 | 2.8 | 7.1 |

The table indicates that coral fossil limestone and the mixture of coral fossil limestone and dolomite, when used as soil improving agents, result in yields which are 40 to 50% higher than those obtained by the use of conventional limestone or magnesia-lime.

Although the reason why coral fossil limestone acts more effectively on plant growth than conventionally used limestone has not been clarified yet, it is attributable firstly to the fact that the development of coral fossil limestone occurred geologically later than ordinary limestone, so that the former has a less compact and porous structure, permitting calcium to dissolve out at a higher rate and lending itself to the growth of effective soil fungi owing to the presence of numerous pores. Secondly, the various trace elements contained in coral fossil limestone presumably serve as nutrients for plant growth.

The method for improving soil according to this invention is useful for the growth of various cereal crops and vegetables including corn, barley, wheat, potatoes and cabbages. For crops such as spinach which grow up at a higher rate, it is preferable to divide coral fossil limestone to smaller particle sizes, enabling the same to act effectively rapidly, whilst it is advantageous to use it in the form of coarse particles and to thereby assure a sustained effect for crops such as barley which require longer period for growth.

What I claim is:

1. A method for improving soil by mixing finely divided coral fossil limestone with the soil to maintain soil pH at a substantially neutral value.

2. The method for improving soil as set forth in claim 1 wherein the coral fossil limestone is divided to particle sizes of not larger than 30 mesh.

3. The method for improving soil as set forth in claim 1 wherein a finely divided basic magnesium compound is mixed with the coral fossil limestone and the resulting mixture is mixed with the soil.

4. The method for improving soil as set forth in claim 3 wherein the basic magnesium compound is dolomite.

5. The method for improving soil as set forth in claim 4 wherein a mixture of 80% by weight of coral fossil limestone and 20% by weight of dolomite is mixed with the soil.

6. The method for improving soil as set forth in claim 3 wherein the basic magnesium compound is mixed, in a proportion of 1.0 to 10.0% by weight calculated as MgO, with the coral fossil limestone.

7. The method for improving soil as set forth in claim 3 wherein finely divided magnesium hydroxide is mixed, in a proportion of up to 10% by weight, with the coral fossil limestone and the resulting mixture is mixed with the soil.

* * * * *